(12) United States Patent
Lin et al.

(10) Patent No.: US 9,155,035 B2
(45) Date of Patent: Oct. 6, 2015

(54) BASE STATION AND WIRELESS DEVICE FOR DETERMINATION OF WIRELESS DEVICE TYPE USING IDENTIFYING INFORMATION IN AN UPLINK SIGNAL TRANSMITTED BY THE WIRELESS DEVICE

(75) Inventors: Yi-Ting Lin, New Taipei (TW); Tsung-Yu Tsai, Tainan County (TW); Chun-Che Chien, Taipei (TW)

(73) Assignee: Institute for Information Industry, Taipei (TW)

( * ) Notice: Subject to any disclaimer, the term of this patent is extended or adjusted under 35 U.S.C. 154(b) by 856 days.

(21) Appl. No.: 13/343,489

(22) Filed: Jan. 4, 2012

(65) Prior Publication Data
US 2012/0178463 A1   Jul. 12, 2012

Related U.S. Application Data (60) Provisional application No. 61/430,583, filed on Jan. 7, 2011.

(51) Int. Cl.
*H04W 48/20*   (2009.01)
*H04W 88/10*   (2009.01)

(52) U.S. Cl.
CPC .............. *H04W 48/20* (2013.01); *H04W 88/10* (2013.01)

(58) Field of Classification Search
CPC .................................................... H04W 88/10
USPC ...................................... 455/411, 41.2, 552.1
See application file for complete search history.

(56) References Cited

U.S. PATENT DOCUMENTS

| | | | |
|---|---|---|---|
| 7,804,799 B2 | 9/2010 | Venkatachalam et al. | |
| 2009/0323652 A1 | 12/2009 | Chen et al. | |
| 2010/0041384 A1* | 2/2010 | Kazmi | 455/419 |
| 2010/0254337 A1 | 10/2010 | Lin et al. | |
| 2012/0142268 A1* | 6/2012 | Tao et al. | 455/3.05 |
| 2012/0163160 A1* | 6/2012 | Himayat et al. | 370/216 |

FOREIGN PATENT DOCUMENTS

| | | |
|---|---|---|
| CN | 101730193 A | 6/2012 |
| CN | 101860393 A | 6/2013 |
| JP | 2010-028622 A | 2/2010 |

OTHER PUBLICATIONS

Office Action to the corresponding Chinese Patent Application No. 201210012029.2 rendered by the State Intellectual Property Office of China (SIPO) on Jan. 13, 2014, 9 pages (including English translation).

(Continued)

*Primary Examiner* — Rafael Pérez-Gutiérrez
*Assistant Examiner* — Joshua Schwartz
(74) *Attorney, Agent, or Firm* — Skaar Ulbrich Macari, P.A.

(57) ABSTRACT

A base station and a wireless device for use in a communication system are provided. The communication system has a first-type communication standard and a second-type communication standard. The base station receives an uplink signal with a station identification and a piece of identifying information from the wireless device, and determines that the wireless device belongs to one of a first-type wireless device and a second-type wireless device according to the identifying information. The first-type wireless device conforms to the first-type communication standard and the second-type wireless device conforms to the second-type communication standard.

20 Claims, 6 Drawing Sheets

(56) References Cited

OTHER PUBLICATIONS

Office Action for Korean counterpart application to the present US application rendered by Korean Patent Office, Nov. 14, 2013, 8 pages (including English translation).

Office Action to the corresponding Taiwan Patent Application No. 101100037 rendered by Taiwan Intellectual Property Office (TIPO) on Mar. 18, 2014, 6 pages (including English translation).

* cited by examiner

BASE STATION AND WIRELESS DEVICE FOR DETERMINATION OF WIRELESS DEVICE TYPE USING IDENTIFYING INFORMATION IN AN UPLINK SIGNAL TRANSMITTED BY THE WIRELESS DEVICE

PRIORITY

This application claims the benefit of priority to U.S. Provisional Application No. 61/430,583 filed on Jan. 7, 2011, which is hereby incorporated by reference in its entirety.

FIELD

The present invention relates to a base station and a wireless device for a communication system. More particularly, the base station of the present invention can determine that the wireless device belongs to one of a first-type wireless device and a second-type wireless device according to a piece of identifying information in an uplink signal transmitted by the wireless device.

BACKGROUND

With advancement of the science and technologies, applications and services of network technologies have become widespread gradually. In order to satisfy various requirements of users on data transmissions in different service environments, various communication transmission technologies and communication standards have been developed. The worldwide interoperability for Microwave Access (WiMAX) system is a point-to-multipoint broadband wireless accessing technology, and is one of the communication systems that have experienced rapid development in recent years.

The WiMAX system is implemented on the basis of the IEEE 802.16 series standards. According to the IEEE 802.16m standard for WiMAX, a station identification (STID) is assigned by a base station to a wireless device when a connection is to be established between the base station and the wireless device. One purpose of the STID is for use in a bandwidth request channel. When the wireless device desires to inform the base station of an uplink bandwidth required for uplink data transmission after the connection is established, the wireless device must transmit the STID thereof and bandwidth request information to the base station through the bandwidth request channel.

Because the STID has a length of 12 bits, the base station is able to recognize only up to 4096 wireless devices. As the IEEE 802.16p standard for WiMAX has also been developed, STIDs that can be assigned by the base station will be exhausted quickly if the base station is to serve both wireless devices conforming to the IEEE 802.16m standard (also known as advanced mobile stations; AMSs) and wireless devices conforming to the IEEE 802.16p standard (also known as Machine to Machine devices; M2M devices) at the same time.

Accordingly, an urgent need exists in the art to solve the problem of shortage of STIDs under the existing physical layer framework of the bandwidth request channel.

SUMMARY

An objective of the present invention is to provide a mechanism of extending station identifications (STIDs) under the existing physical layer framework of the bandwidth request channel. A wireless device of the present invention transmits an uplink signal comprising a station identification and a piece of identifying information to a base station. Then, the base station can determine that the wireless device belongs to one of a first-type wireless device and a second-type wireless device according to the identifying information. With this mechanism, the base station can extend use of the station identification by repeatedly assigning the same station identification to a first-type wireless device and a second-type wireless device. Thereby, the problem with the prior art that station identifications are in shortage can be solved. For a WiMAX system, the first-type wireless device is a wireless device conforming to the IEEE 802.16m standard, and the second-type wireless device is a wireless device conforming to the IEEE 802.16p standard.

To achieve the aforesaid objective, certain embodiments of the present invention disclose a base station for a communication system. The communication system has a first-type communication standard and a second-type communication standard. The base station comprises a transceiver and a processor. The transceiver is configured to receive an uplink signal from a wireless device. The uplink signal comprises a station identification (STID) and a piece of identifying information. The processor electrically connected to the transceiver is configured to determine that the wireless device belongs to one of a first-type wireless device and a second-type wireless device according to the identifying information. The first-type wireless device conforms to the first-type communication standard, and the second-type wireless device conforms to the second-type communication standard.

To achieve the aforesaid objective, certain embodiments of the present invention further disclose a wireless device for a communication system. The communication system has a first-type communication standard and a second-type communication standard. The wireless device comprises a processor and a transceiver. The processor is configured to generate an uplink signal. The uplink signal comprises a station identification and a piece of identifying information. The transceiver electrically connected to the processor is configured to transmit the uplink signal to a base station so that the base station determines that the wireless device belongs to one of a first-type wireless device and a second-type wireless device according to the identifying information. The first-type wireless device conforms to the first-type communication standard, and the second-type wireless device conforms to the second-type communication standard.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

The present invention relates to a base station and a wireless device for use in a communication system. In the following description, the present invention will be explained with reference to example embodiments thereof. It shall be appreciated that, these example embodiments are not intended to limit the present invention to any specific example, embodiment, environment, applications or particular implementations described in these example embodiments. Therefore, description of these example embodiments is only for purpose of illustration rather than to limit the present invention, and the scope of the present invention shall be governed by the claims. In addition, in the following example embodiments and the attached drawings, elements not directly related to the present invention are omitted from depiction; and dimensional relationships among individual elements in the attached drawings are illustrated only for ease of understanding, but not to limit the actual scale.

Figure 1:
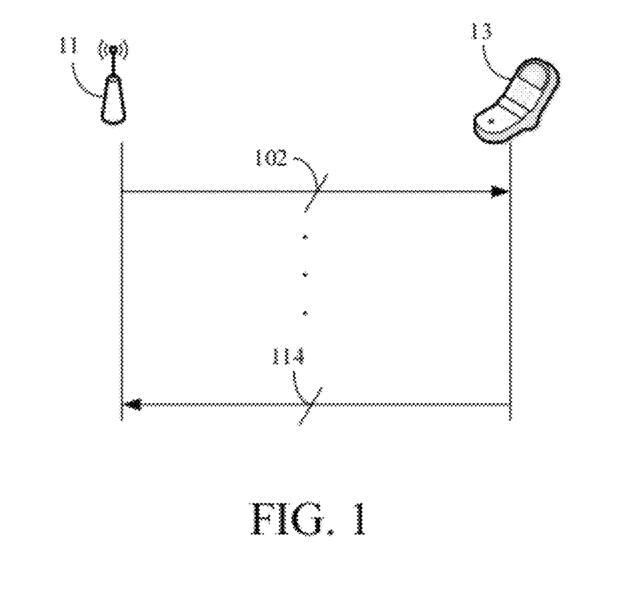
FIG. 1 depicts signal transmission between a base station 11 and a wireless device 13 of the present invention.

A first embodiment of the present invention is shown in FIG. 1, which depicts signal transmission between a base station 11 and a wireless device 13 of the present invention. The base station 11 and the wireless device 13 are used for a communication system which has a first-type communication standard and a second-type communication standard. The base station 11 has a signal coverage and provides a communication service for one or more wireless devices located within the signal coverage. The wireless device 13 is located within the signal coverage of the base station 11. It shall be appreciated that, the base station 11 interacts with each of the wireless devices in substantially the same way, so for simplicity of description, only interactions between the base station 11 and the wireless device 13 will be described hereinbelow.

The base station 11 establishes a connection with the wireless device 13. In the process of establishing the connection, the base station 11 transmits a downlink signal 102 to the wireless device 13. The downlink signal 102 carries an allocation message comprising a station identification (STID). If the wireless device 13 needs to transmit uplink data to the base station 11 after the connection is established, then the wireless device 13 transmits an uplink signal 114 to inform the base station of an uplink bandwidth required. The uplink signal 114 comprises the STID assigned by the base station 11 and a piece of identifying information.

After the uplink signal 114 is received, the base station 11 can determine that the wireless device 13 belongs to a first-type wireless device or a second-type wireless device according to the identifying information. The first-type wireless device conforms to the first-type communication standard, and the second-type wireless device conforms to the second-type communication standard. Accordingly, the base station 11 can extend use of the STID by assigning the same STID to a first-type wireless device and a second-type wireless device and determining whether the uplink signal 114 is transmitted by the first-type wireless device or the second-type wireless device according to the identifying information. Thereby, the problem with the prior art that STIDs are in shortage can be solved.

Figure 2:
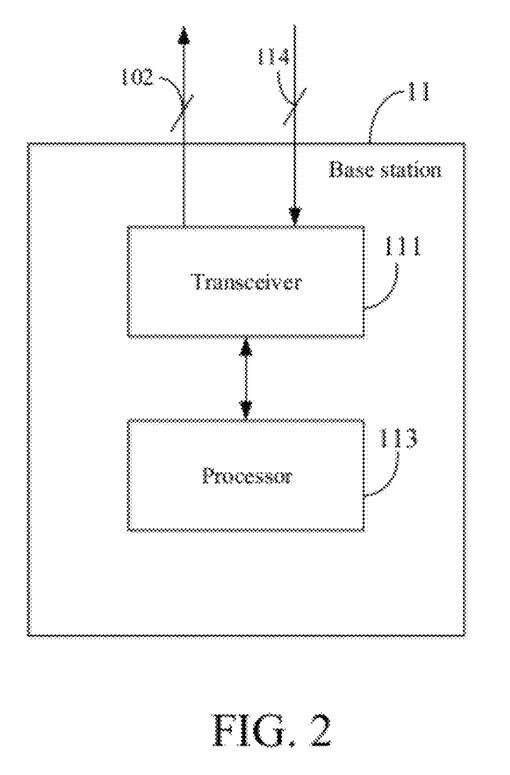
FIG. 2 is a schematic view of the base station 11 of the present invention.

Specifically, as shown in FIG. 2, the base station 11 comprises a transceiver 111 and a processor 113. The processor 113, which is electrically connected to the transceiver 111, is configured to generate the allocation message comprising the STID. The transceiver 111 is configured to transmit the downlink signal 102 carrying the allocation message to the wireless device 13. Furthermore, the transceiver 111 is further configured to receive the uplink signal 114 from the wireless device 113. The processor 113 is further configured to determine that the wireless device 13 belongs to one of the first-type wireless device and the second-type wireless device according to the identifying information.

Figure 3:
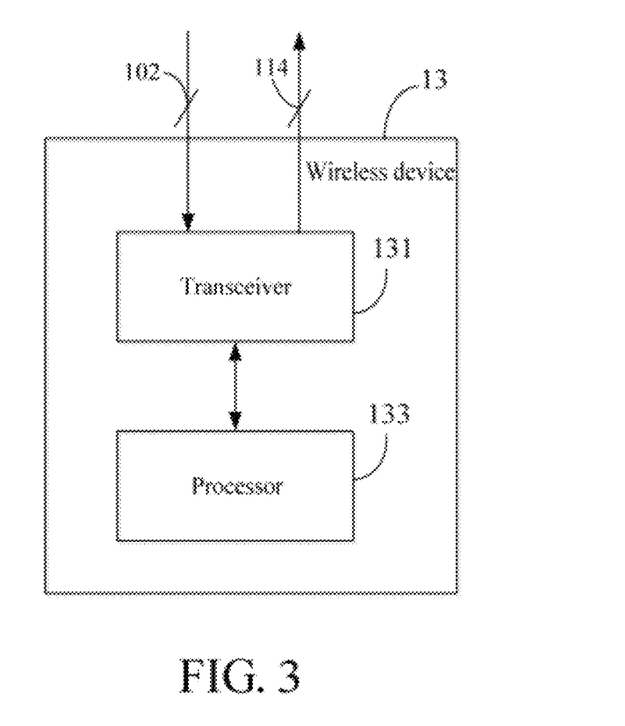
FIG. 3 is a schematic view of the wireless device 13 of the present invention.

Referring next to FIG. 3, the wireless device 13 comprises a transceiver 131 and a processor 133. The processor 133 receives the downlink signal 102 carrying the allocation message from the base station 11 and retrieves the STID from the allocation message. The processor 133 further generates the uplink signal 114 comprising the STID and the identifying information. The transceiver 131, which is electrically connected to the processor 133, is configured to transmit the uplink signal 114 to the base station 11. Thus, the base station 11 can determine that the wireless device 13 belongs to one of the first-type wireless device and the second-type wireless device according to the identifying information in the uplink signal 114.

Referring to FIG. 1 to FIG. 5 together, a second embodiment of the present invention is a further extension of the first embodiment. In this embodiment, the base station 11 and the wireless device 13 are used for a Worldwide Interoperability for Microwave Access (WiMAX) system, the first-type communication standard is an IEEE 802.16m standard, and the second-type communication standard is an IEEE 802.16p standard.

Figure 4:
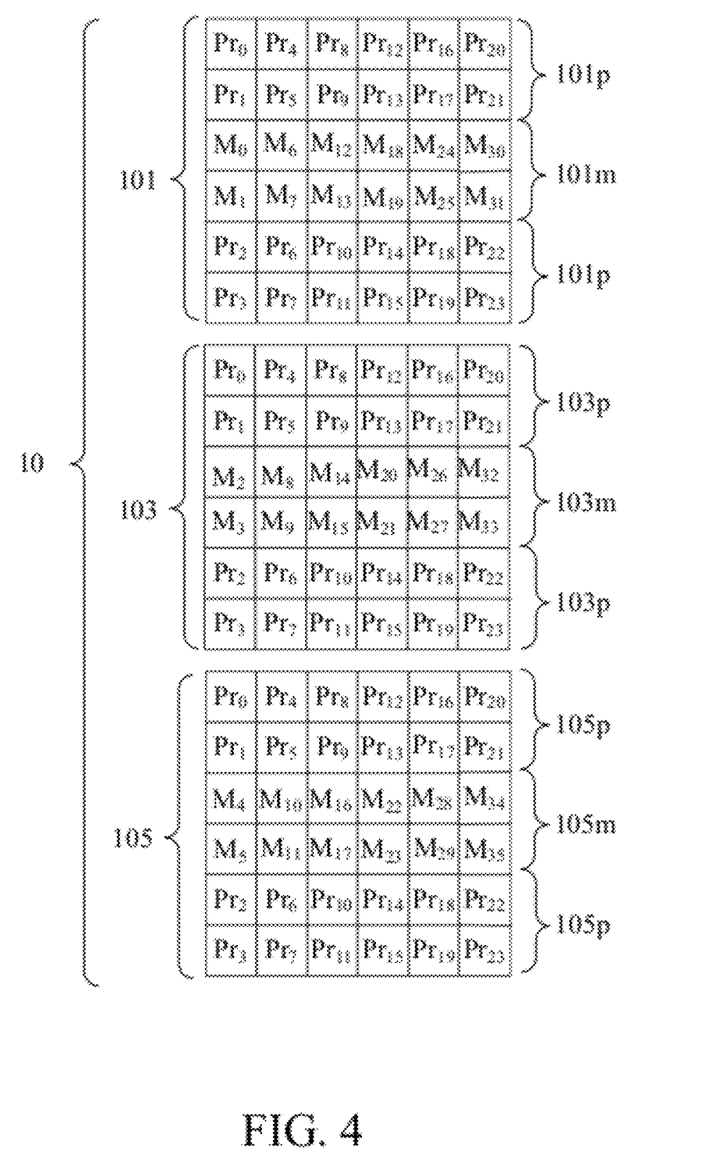
FIG. 4 is a schematic view of a bandwidth request channel 10.

As shown in FIG. 4, the uplink signal 114 comprises a subframe. The subframe comprises a bandwidth request channel (BR channel) 10. The bandwidth request channel 10 comprises three bandwidth request blocks 101, 103, 105. Each of the bandwidth request blocks 101, 103, 105 consists of six consecutive subcarriers and six orthogonal frequency division multiplexing (OFDM) symbols. The bandwidth request block 101 comprises a data subcarrier set 101$m$ and a preamble sequence subcarrier set 101$p$. $M_i$ represents the $i^{th}$ data subcarrier (i=0~35) and $Pr_j$ represents the $j^{th}$ preamble sequence subcarrier (j=0~23). Similarly, the bandwidth request block 103 also comprises a data subcarrier set 103$m$ and a preamble sequence subcarrier set 103$p$, and the bandwidth request block 105 also comprises a data subcarrier set 105$m$ and a preamble sequence subcarrier set 105$p$.

Figure 5:
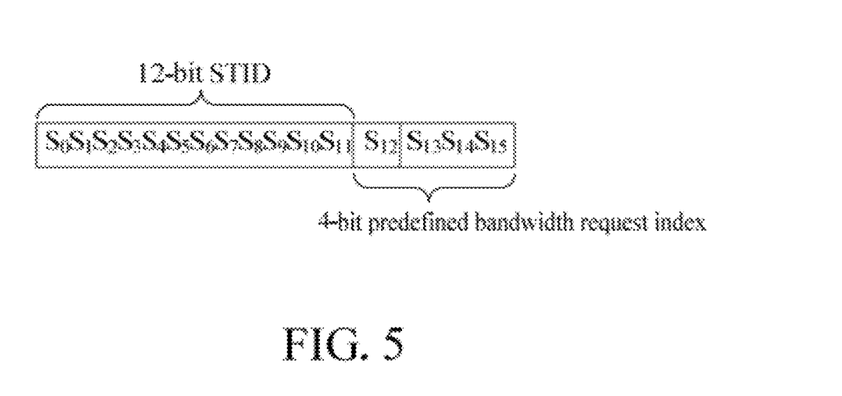
FIG. 5 is a schematic view of a 12-bit station identification and a 4-bit predefined bandwidth request index.

In this embodiment, the data subcarrier sets 101$m$, 103$m$, 105$m$ are used to carry an access message, which comprises the STID of the wireless device 13 and a first bit of a predefined bandwidth request index. The STID and the predefined bandwidth request index are as shown in FIG. 5. The STID consists of twelve bits $S_0S_1S_2S_3S_4S_5S_6S_7S_8S_9S_{10}S_{11}$, and the predefined bandwidth request index consists of four bits $S_{12}S_{13}S_{14}S_{15}$.

The processor 133 of the wireless device 13 embeds the 12-bit STID and the first bit $S_{22}$ of the predefined bandwidth request index into the access message. The first bit $S_{12}$ of the predefined bandwidth request index is used to represent the identifying information. For example, when the first bit $S_{12}$ is 0, the wireless device 13 belongs to the first-type wireless device (i.e., a wireless device conforming to the IEEE 802.16m standard); and when the first bit $S_{12}$ is 1, the wireless device 13 belongs to the second-type wireless device (i.e., a wireless device conforming to the IEEE 802.16p standard). Therefore, the processor 133 of the wireless device 13 generates the first bit $S_{12}$ depending on the type of the wireless device 13 itself. After the uplink signal 114 is received by the transceiver 111 of the base station 11, the processor 113 can determine that the wireless device 13 belongs to the first-type wireless device or the second-type wireless device according to the first bit $S_{12}$. In this case, even if the two wireless devices of different types are assigned the same STID, they can still be differentiated by the base station 11 according to the first bit $S_{12}$.

In this embodiment, the second bits $S_{13}S_{14}S_{15}$ of the predefined bandwidth request index generated by the processor 133 of the wireless device 13 are used to represent a bandwidth request size. The WiMAX system defines twenty four preamble sequences, so after generating the second bits $S_{13}S_{14}S_{15}$, the processor 133 of the wireless device 13 can select one preamble sequence from the twenty four preamble sequences according to the second bits $S_{13}S_{14}S_{15}$ and have the selected preamble sequence carried in the preamble sequence subcarrier sets 101*p*, 103*p*, 105*p* (the preamble sequence subcarrier sets 101*p*, 103*p*, 105*p* carry the same preamble sequence). In other words, the second bits $S_{13}S_{14}S_{15}$ correspond to the twenty four preamble sequences (eight of the twenty four preamble sequences for a wireless device, which correspond to eight values represented by the second bits $S_{13}S_{14}S_{15}$). After the uplink signal 114 is received by the transceiver 111 of the base station 11, the processor 133 can retrieve the second bits $S_{13}S_{14}S_{15}$ according to the preamble sequence carried by the preamble sequence subcarrier sets 101*p*, 103*p*, 105*p* and then allocate an uplink bandwidth to the wireless device 13 according to the bandwidth request size represented by the second bits $S_{13}S_{14}S_{15}$.

It shall be appreciated that, the correspondence relationship between the second bits $S_{13}S_{14}S_{15}$ and the twenty four preamble sequences may be achieved through table lookup or through pre-formulated four arithmetic operations (e.g., a permutation relational expression formulated in the IEEE 802.16m standard). According to the IEEE 802.16m standard, operations are made on the second bits $S_{13}S_{14}S_{15}$ and the STID for use as a basis in selecting a preamble sequence, so the permutation relational expression formulated therein can be viewed as further having the STID as the basis for selection; i.e., one of the twenty four preamble sequences is selected according to the STID $(S_0S_1S_2S_3S_4S_5S_6S_7S_8S_9S_{10}S_{11})$ and the second bits $S_{13}S_{14}S_{15}$. As the correspondence relationships among the STID, the second bits $S_{13}S_{14}S_{15}$ and the twenty four preamble sequences can be readily appreciated by those of ordinary skill in the art according to the existing IEEE 802.16m standard, only "selecting a preamble sequence according to the second bits" and "retrieving the second bits according to the preamble sequence" will be described hereinafter while description related to the STID is omitted for simplicity of description.

Referring also to FIG. 1 to FIG. 5 together, a third embodiment of the present invention is also a further extension of the first embodiment. This embodiment is different from the second embodiment in that, at least one of the second bits $S_{13}S_{14}S_{15}$ is used to represent an extension station identification when the wireless device 13 belongs to the second-type wireless device (i.e., a wireless device conforming to the IEEE 802.16p standard).

As an example, when the second bit $S_{13}$ is used to represent an extension station identification, the allocation message generated by the processor 113 of the base station 11 further comprises a 1-bit extension station identification in addition to the STID. The processor 133 of the wireless device 13 further retrieves the extension station identification from the allocation message. Then, the processor 133 of the wireless device 13 generates the second bits $S_{13}S_{14}S_{15}$, and uses the second bit $S_{13}$ to represent the extension station identification and uses the second bits $S_{14}S_{15}$ to represent the bandwidth request size. The processor 133 of the wireless device 13 selects one preamble sequence from the twenty four preamble sequences according to the extension station identification $S_{13}$ and the second bits $S_{14}S_{15}$. After the processor 113 of the base station 11 determines that the wireless device 13 belongs to the second-type wireless device according to the first bit $S_{12}$, the processor 113 recognizes the wireless device 13 according to the STID and the extension station identification $S_{13}$. In this case, there are four choices (i.e., four values represented by the second bits $S_{14}S_{15}$) for the bandwidth size required by the second-type wireless device.

As another example, when the second bits $S_{13}S_{14}$ are used to represent an extension station identification, the allocation message generated by the processor 113 of the base station 11 further comprises a 2-bit extension station identification in addition to the STID. The processor 133 of the wireless device 13 uses the second bits $S_{13}S_{14}$ to represent the extension station identification and uses the second bit $S_{15}$ to represent the bandwidth request size, and selects one preamble sequence from the twenty four preamble sequences according to the extension station identification $S_{13}S_{14}$ and the second bit $S_{15}$. Then, after the processor 113 of the base station 11 determines that the wireless device 13 belongs to the second-type wireless device according to the first bit $S_{12}$, the processor 113 recognizes the wireless device 13 according to the STID and the extension station identification $S_{13}S_{14}$. In this case, there are two choices (i.e., two values represented by the second bit $S_{15}$) for the bandwidth size required by the second-type wireless device.

As a further example, when the second bits $S_{13}S_{14}S_{15}$ are all used to represent an extension station identification, the allocation message generated by the processor 113 of the base station 11 further comprises a 3-bit extension station identification in addition to the STID. Furthermore, the processor 133 of the wireless device 13 selects one preamble sequence from the twenty four preamble sequences according to the extension station identification $S_{13}S_{14}S_{15}$. Then, after the processor 113 of the base station 11 determines that the wireless device 13 belongs to the second-type wireless device according to the first bit $S_{12}$, the processor 113 recognizes the wireless device 13 according to the STID and the extension station identification $S_{13}S_{14}S_{15}$. In this case, the bandwidth size required by the second-type wireless device is a fixed value.

Accordingly, this embodiment further extends use of the STID by using at least one of the second bits $S_{13}S_{14}S_{15}$ of the predefined bandwidth request index as the extension station identification of the second-type wireless device. Thus, the base station 11 can provide the communication service for a larger number of second-type wireless devices. It shall be appreciated that, when the wireless device 13 belongs to the first-type wireless device (i.e., a wireless device conforming to the IEEE 802.16m standard), the wireless device 13 still uses the second bits $S_{13}S_{14}S_{15}$ to represent the bandwidth request size.

Figure 6:
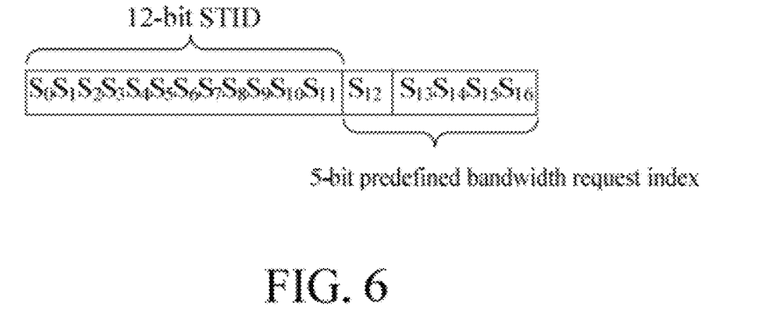
FIG. 6 is a schematic view of the 12-bit station identification and a 5-bit predefined bandwidth request index.

Referring also to FIG. 1 to FIG. 4 and FIG. 6 together, a fourth embodiment of the present invention is also a further extension of the second embodiment and the third embodiment. Different from the second embodiment and the third embodiment, the number of the second bits generated by the processor 133 of the wireless device 13 in this embodiment is four (i.e., $S_{13}S_{14}S_{15}S_{16}$ as shown in FIG. 6). In other words, the twenty four preamble sequences (sixteen of the twenty four preamble sequences for a wireless device) can be used to represent sixteen values of the four bits.

Specifically, when the processor 113 of the base station 11 determines that the wireless device 13 belongs to the first-type wireless device according to the first bit $S_{22}$ in this embodiment, the processor 113 obtains the four second bits $S_{13}S_{14}S_{15}S_{16}$ according to the preamble sequence carried by the preamble sequence subcarrier sets 101p, 103p, 105p, and the second bits $S_{13}S_{14}S_{15}S_{16}$ are used to represent the bandwidth request size. Furthermore, when the processor 113 determines that the wireless device 13 belongs to the second-type wireless device according to the first bit $S_{12}$, the processor 113 obtains the four second bits $S_{13}S_{14}S_{15}S_{16}$ according to the preamble sequence carried by the preamble sequence subcarrier sets 101p, 103p, 105p, and at least one of the second bits $S_{13}S_{14}S_{15}S_{16}$ can be used to represent the extension station identification.

Referring also to FIG. 1 to FIG. 5 together, a fifth embodiment of the present invention is also a further extension of the first embodiment. This embodiment is different from the second embodiment in that, the first-type wireless device (i.e., a wireless device conforming to the IEEE 802.16m standard) and the second-type wireless device (i.e., a wireless device conforming to the IEEE 802.16p standard) select one of the twenty four preamble sequences respectively by means of different permutation relational expressions (or through table lookup) and the preamble sequences selected by the first-type wireless device and the second-type wireless device will not be identical to each other, so the selected preamble sequences can be used to represent the identifying information.

Specifically in this embodiment, when the wireless device 13 is the first-type wireless device, the processor 133 generates the second bits $S_{13}S_{14}S_{15}$ and selects the preamble sequence carried by the preamble sequence subcarrier sets 101p, 103p, 105p from the twenty four preamble sequences by means of a first permutation relational expression according to the second bits. In this case, the first bit $S_{22}$ and the second bits $S_{13}S_{14}S_{15}$ are used to represent the bandwidth request size. On the other hand, when the wireless device 13 is the second-type wireless device, the processor 133 generates the second bits $S_{13}S_{14}S_{15}$ and selects the preamble sequence carried by the preamble sequence subcarrier sets 101p, 103p, 105p from the twenty four preamble sequences by means of a second permutation relational expression according to the second bits. In this case, at least one of the first bit $S_{12}$ and the second bits $S_{13}S_{14}S_{15}$ can be used to represent the extension station identification. For a particular wireless device, the preamble sequences selected by means of the first permutation relational expression and the preamble sequences selected by means of the second permutation relational expression are exclusive to each other.

The processor 113 of the base station 11 determines that the wireless device belongs to one of the first-type wireless device and the second-type wireless device by means of the first permutation relational expression and the second permutation relational expression according to the preamble sequence carried by the preamble sequence subcarrier sets. In detail, if the preamble sequence carried by the preamble sequence subcarrier sets 101p, 103p, 105p is one of the preamble sequences that can be selected by means of the first permutation relational expression (i.e., one of the preamble sequences corresponding to the second bits in accordance with the first permutation relational expression), then the processor 113 determines that the wireless device 13 is the first-type wireless device. Conversely, if the preamble sequence carried by the preamble sequence subcarrier sets 101p, 103p, 105p is one of the preamble sequences that can be selected by means of the second permutation relational expression (i.e., one of the preamble sequences corresponding to the second bits in accordance with the second permutation relational expression), then the processor 113 determines that the wireless device 13 is the second-type wireless device.

Accordingly, the base station 11 in this embodiment can determine that the wireless device 13 belongs to one of the first-type wireless device and the second-type wireless device according to the preamble sequence carried by the preamble sequence subcarrier sets 101p, 103p, 105p instead of according to the first bit $S_{12}$ of the predefined bandwidth request index.

Referring also to FIG. 1 to FIG. 5 together, a sixth embodiment of the present invention is also a further extension of the first embodiment. Different from the second embodiment to the fifth embodiment, this embodiment determines that the wireless device 13 belongs to one of the first-type wireless device and the second-type wireless device according to a sameness of the preamble sequences carried by the preamble sequence subcarrier sets 101p, 103p, 105p, so the preamble sequences can be used to represent the identifying information.

Specifically, when the wireless device 13 belongs to the first-type wireless device (i.e., a wireless device conforming to the IEEE 802.16m standard), the processor 133 of the wireless device 13 has the preamble sequence subcarrier sets 101p, 103p, 105p carry a same preamble sequence. However, when the wireless device 13 belongs to the second-type wireless device (i.e., a wireless device conforming to the IEEE 802.16p standard), the processor 133 of the wireless device 13 has the preamble sequence subcarrier sets 101p, 103p, 105p carry different preamble sequences.

For example, if the wireless device 13 belongs to the first-type wireless device, the processor 133 still selects one preamble sequence from the twenty four preamble sequences according to the generated second bits $S_{13}S_{14}S_{15}$ and has the selected preamble sequence carried in the preamble sequence subcarrier sets 101p, 103p, 105p. However, if the wireless device 13 belongs to the second-type wireless device, the processor 133 selects one preamble sequence from the twenty four preamble sequences according to the generated second bits $S_{13}S_{14}S_{15}$ and has the selected preamble sequence carried in the preamble sequence subcarrier set 101p while the preamble sequence subcarrier sets 103p, 105p carry different preamble sequences. It shall be appreciated that, the preamble sequence carried by one of the preamble sequence subcarrier sets 103p, 105p may be the same as the preamble sequence carried in the preamble sequence subcarrier set 101p, and the preamble sequence carried by the other of the preamble sequence subcarrier sets 103p, 105p may be selected from the remaining twenty three one preamble sequences at random. Furthermore, the preamble sequence subcarrier sets 103p, 105p may also select two preamble sequences from the remaining twenty three preamble sequences at random.

When the wireless device 13 is the first-type wireless device, the processor 113 can determine that the wireless device 13 belongs to the first-type wireless device according to the same preamble sequence carried by the preamble sequence subcarrier sets 101p, 103p, 105p after the uplink signal 114 is received by the transceiver 111 of the base station 11. In this case, the predefined bandwidth request index (i.e., the first bit $S_{12}$ and the second bits $S_{13}S_{14}S_{15}$) is used to represent a bandwidth request size. On the other hand, when the wireless device 13 is the second-type wireless device, the processor 113 can determine that the wireless device 13 belongs to the second-type wireless device according to the different preamble sequences carried by the preamble sequence subcarrier sets 101p, 103p, 105p. In this case, at least one bit of the predefined bandwidth request index (i.e., the first bit $S_{12}$ and the second bits $S_{13}S_{14}S_{15}$) is used to represent an extension station identification.

Briefly, in this embodiment, the preamble sequences carried by the preamble sequence subcarrier sets 101p, 103p, 105p must include at least two different preamble sequences if the wireless device belongs to the second-type wireless device. In addition, the preamble sequence selected according to the second bits $S_{13}S_{14}S_{15}$ is not limited to be carried by the preamble sequence subcarrier set 101p, but may also be selectively carried by one of the preamble sequence subcarrier sets 103p, 105p as long as this is pre-determined between the base station 11 and the wireless device 13. Thus, the processor 113 of the base station 11 can determine the type of the wireless device 13 according to the sameness of the preamble sequences carried by the preamble sequence subcarrier sets 101p, 103p, 105p.

Referring also to FIG. 1 to FIG. 5 together, a seventh embodiment of the present invention is also a further extension of the first embodiment. This embodiment is different from the second embodiment in that, one of the second bits ($S_{13}S_{14}S_{15}$) of the predefined bandwidth request index is used to represent the identifying information.

When the second bits are generated by the processor 133 of the wireless device 13, one of the second bits is generated according to the type of the wireless device 13 itself and used to represent the identifying information. In this case, the processor 113 of the base station 11 retrieves the second bits according to the preamble sequence carried by each of the preamble sequence subcarrier sets 101p, 103p, 105p, and then determines that the wireless device 13 belongs to one of the first-type wireless device and the second-type wireless device according to the identifying information represented by one of the second bits.

For example, if the second bit $S_{15}$ represents the identifying information, then the processor 133 of the wireless device 13 generates the second bit $S_{15}$ according to the type of the wireless device 13 itself, and the processor 113 of the base station 11 determines that the wireless device 13 belongs to one of the first-type wireless device and the second-type wireless device according to the second bit $S_{15}$. Similarly, when the wireless device 13 is the first-type wireless device, the processor 133 of the wireless device 13 generates the first bit $S_{12}$ and the second bits $S_{13}S_{14}$ of the predefined bandwidth request index to represent the bandwidth request size. In addition, when the wireless device 13 is the second-type wireless device, the processor 133 of the wireless device 13 can use at least one of the first bit $S_{12}$ and the second bits $S_{13}S_{14}$ of the predefined bandwidth request index to represent the extension station identification while the other bits are used to represent the bandwidth request size.

In addition, this embodiment may also extend the second bits into four bits (as shown in FIG. 6) as in the fourth embodiment. Accordingly, the number of the second bits generated by the processor 133 of the wireless device 13 is four (i.e., $S_{13}S_{14}S_{15}S_{16}$). If the second bit $S_{15}$ represents the identifying information, then the first bit $S_{12}$ and the second bits $S_{13}S_{14}$ and $S_{16}$ of the predefined bandwidth request index are used to represent the bandwidth request size for the first-type wireless device, and at least one of the first bit $S_{12}$ and the second bits $S_{13}S_{14}$ and $S_{16}$ of the predefined bandwidth request index is used to represent the extension station identification while the other bits are used to represent the bandwidth request size for the second-type wireless device.

According to the above descriptions, the present invention provides a mechanism of extending station identifications under the existing physical layer framework of the bandwidth request channel. With this mechanism, the base station can extend use of the station identification by repeatedly assigning a same station identification to a first-type wireless device and a second-type wireless device. Thereby, the problem with the prior art that station identifications are in shortage can be solved. Furthermore, when the technical means of the present invention is applied to a WiMAX system (here, the first-type wireless device is a wireless device conforming to the IEEE 802.16m standard, and the second-type wireless device is a wireless device conforming to the IEEE 802.16p standard), the present invention can further recognize the wireless device conforming to the IEEE 802.16p standard by using the original physical resources to represent the extension station identification, thereby providing services for a larger number of wireless devices.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station for use in a communication system, the communication system being a Worldwide Interoperability for Microwave Access (WiMAX) system, the communication system having a first-type communication standard and a second-type communication standard, the first-type communication standard being an IEEE 802.16m standard, and the second-type communication standard being an IEEE 802.16p standard, the base station comprising:

a transceiver, being configured to receive an uplink signal from a wireless device, the uplink signal comprising a station identification (STID) and a piece of identifying information, wherein the uplink signal comprises a subframe, the subframe comprises a bandwidth request channel (BR channel), the bandwidth request channel comprises three bandwidth request blocks, each of the bandwidth request blocks comprises a data subcarrier set and a preamble sequence subcarrier set, the data subcarrier sets are used to carry an access message, the access message comprises the station identification and a first bit of a predefined bandwidth request index, the identifying information is represented by the first bit of the predefined bandwidth request index, the communication system defines twenty four preamble sequences, each of the preamble sequence subcarrier sets is configured to carry one of the twenty four preamble sequences, and a plurality of second bits of the predefined bandwidth request index correspond to the twenty four preamble sequences; and a processor electrically connected to the transceiver, being configured to determine that the wireless device belongs to one of a first-type wireless device and a second-type wireless device according to the identifying information, wherein the first-type wireless device conforms to the first-type communication standard and the second-type wireless device conforms to the second-type communication standard.

2. The base station as claimed in claim 1, wherein the processor retrieves the second bits according to the preamble sequence carried by each of the preamble sequence subcarrier sets, and the second bits are used to represent a bandwidth request size.

3. The base station as claimed in claim 1, wherein the processor retrieves the second bits according to the preamble sequence carried by each of the preamble sequence subcarrier sets, the second bits are used to represent a bandwidth request size when the processor determines that the wireless device belongs to the first-type wireless device, and at least one of the second bits is used to represent an extension station identification when the processor determines that the wireless device belongs to the second-type wireless device.

4. The base station as claimed in claim 3, wherein the number of the second bits is four.

5. The base station as claimed in claim 3, wherein the processor generates an allocation message comprising the station identification, and the transceiver transmits a downlink signal to the wireless device, and the allocation message is carried by the downlink signal so that the wireless device retrieves the station identification from the allocation message and embeds the station identification into the access message.

6. The base station as claimed in claim 5, wherein when the wireless device belongs to the second-type wireless device, the allocation message further comprises the extension station identification so that the wireless device further retrieves the extension station identification from the allocation message, generates the second bits according to the extension station identification, and selects the preamble sequence carried by each of the preamble sequence subcarrier sets from the twenty four preamble sequences according to the second bits.

7. A base station for use in a communication system, the communication system being a Worldwide Interoperability for Microwave Access (WiMAX) system, the communication system having a first-type communication standard and a second-type communication standard, the first-type communication standard being an IEEE 802.16m standard, and the second-type communication standard being an IEEE 802.16p standard, the base station comprising:
 a transceiver, being configured to receive an uplink signal from a wireless device, the uplink signal comprising a station identification (STID) and a piece of identifying information, wherein the uplink signal comprises a subframe, the subframe comprises a bandwidth request channel, the bandwidth request channel comprises three bandwidth request blocks, each of the bandwidth request blocks comprises a data subcarrier set and a preamble sequence subcarrier set, the data subcarrier sets are used to carry an access message, the access message comprises the station identification and a first bit of a predefined bandwidth request index, the communication system defines twenty four preamble sequences, each of the preamble sequence subcarrier sets is used to carry one of the twenty four preamble sequences, a plurality of second bits of the predefined bandwidth request index correspond to the twenty four preamble sequences, the identifying information is represented by the preamble sequence carried by each of the preamble sequence subcarrier sets; and
 a processor electrically connected to the transceiver, being configured to determine that the wireless device belongs to one of a first-type wireless device and a second-type wireless device by means of a first permutation relational expression and a second permutation relational expression according to the preamble sequence carried by each of the preamble sequence subcarrier sets, wherein the first-type wireless device conforms to the first-type communication standard and the second-type wireless device conforms to the second-type communication standard.

8. A base station for use in a communication system, the communication system being a Worldwide Interoperability for Microwave Access (WiMAX) system, the communication system having a first-type communication standard and a second-type communication standard, the first-type communication standard being an IEEE 802.16m standard, and the second-type communication standard being an IEEE 802.16p standard, the base station comprising:
 a transceiver, being configured to receive an uplink signal from a wireless device, the uplink signal comprising a station identification (STID) and a piece of identifying information, wherein the uplink signal comprises a subframe, the subframe comprises a bandwidth request channel, the bandwidth request channel comprises three bandwidth request blocks, each of the bandwidth request blocks comprises a data subcarrier set and a preamble sequence subcarrier set, the data subcarrier sets are used to carry an access message, the access message comprises the station identification and a first bit of a predefined bandwidth request index, the communication system defines twenty four preamble sequences, each of the preamble sequence subcarrier sets is used to carry one of the twenty four preamble sequences, a plurality of second bits of the predefined bandwidth request index correspond to the twenty four preamble sequences, the identifying information is represented by the preamble sequence carried by each of the preamble sequence subcarrier sets; and
 a processor electrically connected to the transceiver, being configured to determine that the wireless device belongs to one of a first-type wireless device and a second-type wireless device according to a sameness of the preamble sequences carried by the preamble sequence subcarrier sets, wherein the first-type wireless device conforms to the first-type communication standard and the second-type wireless device conforms to the second-type communication standard.

9. The base station as claimed in claim 8, wherein the first bit and the second bits are used to represent a bandwidth request size when the processor determines that the wireless device belongs to the first-type wireless device, and at least one of the first bit and the second bits is used to represent an extension station identification when the processor determines that the wireless device belongs to the second-type wireless device.

10. A base station for use in a communication system, the communication system being a Worldwide Interoperability for Microwave Access (WiMAX) system, the communication system having a first-type communication standard and a second-type communication standard, the first-type communication standard being an IEEE 802.16m standard, and the second-type communication standard being an IEEE 802.16p standard, the base station comprising:
 a transceiver, being configured to receive an uplink signal from a wireless device, the uplink signal comprising a station identification (STID) and a piece of identifying information, wherein the uplink signal comprises a subframe, the subframe comprises a bandwidth request channel, the bandwidth request channel comprises three bandwidth request blocks, each of the bandwidth request blocks comprises a data subcarrier set and a preamble sequence subcarrier set, the data subcarrier sets are used to carry an access message, the access message comprises the station identification and a first bit of a predefined bandwidth request index, the communication system defines twenty four preamble sequences, each of the preamble sequence subcarrier sets is used to carry one of the twenty four preamble sequences, a plurality of second bits of the predefined bandwidth request index correspond to the twenty four preamble sequences; and a processor electrically connected to the transceiver, being configured to retrieve the second bits according to the preamble sequence carried by each of the preamble sequence subcarrier sets, wherein the identifying information is represented by one of the second bits, the processor determines that the wireless device belongs to one of a first-type wireless device and a second-type wireless device according to the identifying information, and the first-type wireless device conforms to the first-type communication standard and the second-type wireless device conforms to the second-type communication standard.

11. A wireless device for use in a communication system, the communication system being a Worldwide Interoperability for Microwave Access (WiMAX) system, the communication system having a first-type communication standard and a second-type communication standard, the first-type communication standard being an IEEE 802.16m standard, and the second-type communication standard being an IEEE 802.16p standard, the wireless device comprising:

a processor, being configured to generate an uplink signal, the uplink signal comprising a station identification and a piece of identifying information, wherein the uplink signal comprises a subframe, the subframe comprises a bandwidth request channel, the bandwidth request channel comprises three bandwidth request blocks, each of the bandwidth request blocks comprises a data subcarrier set and a preamble sequence subcarrier set, the data subcarrier sets are used to carry an access message, the access message comprises the station identification and a first bit of a predefined bandwidth request index, the identifying information is represented by the first bit of the predefined bandwidth request index, the communication system defines twenty four preamble sequences, each of the preamble sequence subcarrier sets is configured to carry one of the twenty four preamble sequences, and a plurality of second bits of the predefined bandwidth request index correspond to the twenty four preamble sequences; and a transceiver electrically connected to the processor, being configured to transmit the uplink signal to a base station so that the base station determines that the wireless device belongs to one of a first-type wireless device and a second-type wireless device according to the identifying information, wherein the first-type wireless device conforms to the first-type communication standard and the second-type wireless device conforms to the second-type communication standard.

12. The wireless device as claimed in claim 11, wherein the processor generates the second bits for representing a bandwidth request size and selects one preamble sequence from the twenty four preamble sequences according to the second bits, and each of the preamble sequence subcarrier sets is configured to carry the selected preamble sequence.

13. The wireless device as claimed in claim 11, wherein the processor generates the second bits for representing a bandwidth request size and selects the preamble sequence carried by each of the preamble sequence subcarrier sets according to the second bits when the wireless device belongs to the first-type wireless device; and the processor generates the second bits, use at least one of the second bits to represent an extension station identification and selects the preamble sequence carried by each of the preamble sequence subcarrier sets according to the second bits when the wireless device belongs to the second-type wireless device.

14. The wireless device as claimed in claim 13, wherein the number of the second bits is four.

15. The wireless device as claimed in claim 13, wherein the transceiver further receives a downlink signal from the base station, an allocation message is carried by the downlink signal, the allocation message comprises the station identification, and the processor retrieves the station identification from the allocation message and embeds the station identification into the access message.

16. The wireless device as claimed in claim 15, wherein when the wireless device belongs to the second-type wireless device, the allocation message further comprises the extension station identification, and the processor further retrieves the extension station identification from the allocation message, generates the second bits according to the extension station identification, and selects a preamble sequence carried by each of the preamble sequence subcarrier sets from the twenty four preamble sequences according to the second bits.

17. A wireless device for use in a communication system, the communication system being a Worldwide Interoperability for Microwave Access (WiMAX) system, the communication system having a first-type communication standard and a second-type communication standard, the first-type communication standard being an IEEE 802.16m standard, and the second-type communication standard being an IEEE 802.16p standard, the wireless device comprising:

a processor, being configured to generate an uplink signal, the uplink signal comprising a station identification and a piece of identifying information, wherein the uplink signal comprises a subframe, the subframe comprises a bandwidth request channel, the bandwidth request channel comprises three bandwidth request blocks, each of bandwidth request blocks comprises a data subcarrier set and a preamble sequence subcarrier set, the data subcarrier sets are used to carry an access message, the access message comprises the station identification and a first bit of a predefined bandwidth request index, the communication system defines twenty four preamble sequences, each of the preamble sequence subcarrier sets is used to carry one of the twenty four preamble sequences, a plurality of second bits of the predefined bandwidth request index correspond to the twenty four preamble sequences, the identifying information is represented by the preamble sequence carried by each of the preamble sequence subcarrier sets, the processor generates the second bits and selects a preamble sequence carried by each of the preamble sequence subcarrier sets from the twenty four preamble sequences by means of a first permutation relational expression according to the second bits when the wireless device belongs to a first-type wireless device, and the processor generates the second bits and selects a preamble sequence carried by each of the preamble sequence subcarrier sets from the twenty four preamble sequences by means of a second permutation relational expression according to the second bits when the wireless device belongs to a second-type wireless device; and a transceiver electrically connected to the processor, being configured to transmit the uplink signal to a base station so that the base station determines that the wireless device belongs to one of the first-type wireless device and the second-type wireless device according to the identifying information, wherein the first-type wireless device conforms to the first-type communication standard and the second-type wireless device conforms to the second-type communication standard.

18. A wireless device for use in a communication system, the communication system being a Worldwide Interoperability for Microwave Access (WiMAX) system, the communication system having a first-type communication standard and a second-type communication standard, the first-type communication standard being an IEEE 802.16m standard, and the second-type communication standard being an IEEE 802.16p standard, the wireless device comprising:
- a processor, being configured to generate an uplink signal, the uplink signal comprising a station identification and a piece of identifying information, wherein the uplink signal comprises a subframe, the subframe comprises a bandwidth request channel, the bandwidth request channel comprises three bandwidth request blocks, each of the bandwidth request blocks comprises a data subcarrier set and a preamble sequence subcarrier set, the data subcarrier sets are used to carry an access message, the access message comprises the station identification and a first bit of a predefined bandwidth request index, the communication system defines twenty four preamble sequences, each of the preamble sequence subcarrier sets is used to carry one of the twenty four preamble sequences, a plurality of second bits of the predefined bandwidth request index correspond to the twenty four preamble sequences, the identifying information is represented by the preamble sequence carried by each of the preamble sequence subcarrier sets, the processor enables the preamble sequence subcarrier sets to carry a same preamble sequence when the wireless device belongs to a first-type wireless device, and the processor enables the preamble sequence subcarrier sets to carry different preamble sequences when the wireless device belongs to a second-type wireless device; and
- a transceiver electrically connected to the processor, being configured to transmit the uplink signal to a base station so that the base station determines that the wireless device belongs to one of the first-type wireless device and the second-type wireless device according to the identifying information, wherein the first-type wireless device conforms to the first-type communication standard and the second-type wireless device conforms to the second-type communication standard.

19. The wireless device as claimed in claim 18, wherein the processor generates the first bit and the second bits for representing a bandwidth request size when the wireless device belongs to the first-type wireless device, and the processor generates the first bit and the second bits and uses at least one of the first bit and the second bits to represent an extension station identification when the wireless device belongs to the second-type wireless device.

20. A wireless device for use in a communication system, the communication system being a Worldwide Interoperability for Microwave Access (WiMAX) system, the communication system having a first-type communication standard and a second-type communication standard, the first-type communication standard being an IEEE 802.16m standard, and the second-type communication standard being an IEEE 802.16p standard, the wireless device comprising:
- a processor, being configured to generate an uplink signal, the uplink signal comprising a station identification and a piece of identifying information, wherein the uplink signal comprises a subframe, the subframe comprises a bandwidth request channel, the bandwidth request channel comprises three bandwidth request blocks, each of the bandwidth request blocks comprises a data subcarrier set and a preamble sequence subcarrier set, the data subcarrier sets are used to carry an access message, the access message comprises the station identification and a first bit of a predefined bandwidth request index, the communication system defines twenty four preamble sequences, each of the preamble sequence subcarrier sets is used to carry one of the twenty four preamble sequences, a plurality of second bits of the predefined bandwidth request index correspond to the twenty four preamble sequences, the processor generates the second bits and selects a preamble sequence carried by each of the preamble sequence subcarrier sets from the twenty four preamble sequences according to the station identification, and the identifying information is represented by one of the second bits; and
- a transceiver electrically connected to the processor, being configured to transmit the uplink signal to a base station so that the base station determines that the wireless device belongs to one of a first-type wireless device and a second-type wireless device according to the identifying information, wherein the first-type wireless device conforms to the first-type communication standard and the second-type wireless device conforms to the second-type communication standard.

* * * * *